United States Patent [19]
Rench

[11] 3,710,687
[45] Jan. 16, 1973

[54] CONTROL FOR FLUID RAM

[75] Inventor: Thomas R. Rench, Racine, Wis.

[73] Assignee: J. I. Case Company, Racine, Wis.

[22] Filed: Feb. 16, 1971

[21] Appl. No.: 115,683

Related U.S. Application Data

[62] Division of Ser. No. 756,217, Aug. 29, 1968, abandoned.

[52] U.S. Cl. .................................. 91/363 R, 92/113
[51] Int. Cl. ............................ F15b 9/03, F15b 9/09
[58] Field of Search ........ 91/363 R, 363 A, 361, 362; 92/113

[56] References Cited

UNITED STATES PATENTS

| | | | |
|---|---|---|---|
| 2,940,699 | 6/1960 | Plummer | 91/363 A |
| 3,263,824 | 8/1966 | Jones et al. | 91/363 R |
| 3,452,645 | 7/1969 | Barltrop | 91/363 A |

*Primary Examiner*—Paul E. Maslousky
*Attorney*—Daniel G. Cullen et al.

[57] ABSTRACT

A control system for positioning a remote fluid motor having relatively movable elements. The system includes an electric circuit having a control element producing an output related to the relative position of the movable elements, an adjustable element having an output related to the desired position of the movable elements, and an electric comparing mechanism producing a voltage output which is a combined function of the above outputs and which properly positions a valve to control the flow of fluid to and from the fluid ram. The control includes a cantilever beam within the fluid ram whose deflection is responsive to the position of the piston rod. A variable resistor is connected to the beam having an electrical output related to the position of the piston rod.

6 Claims, 5 Drawing Figures

PATENTED JAN 16 1973
3,710,687
SHEET 1 OF 2
FIG. 1
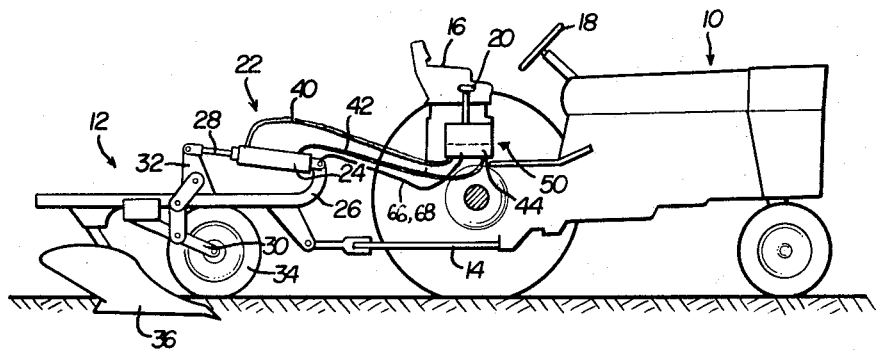
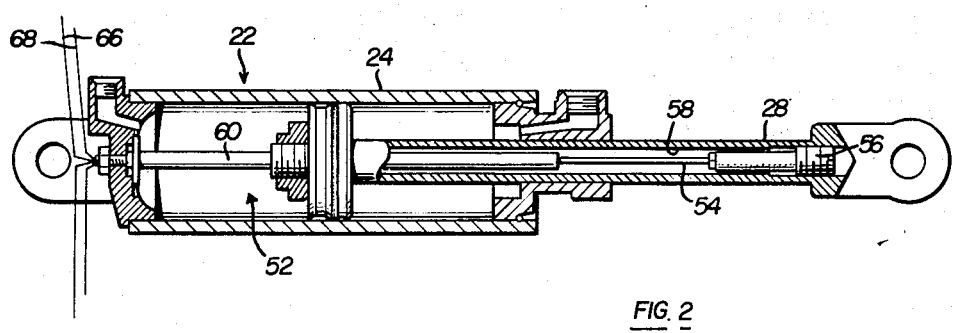
FIG. 2
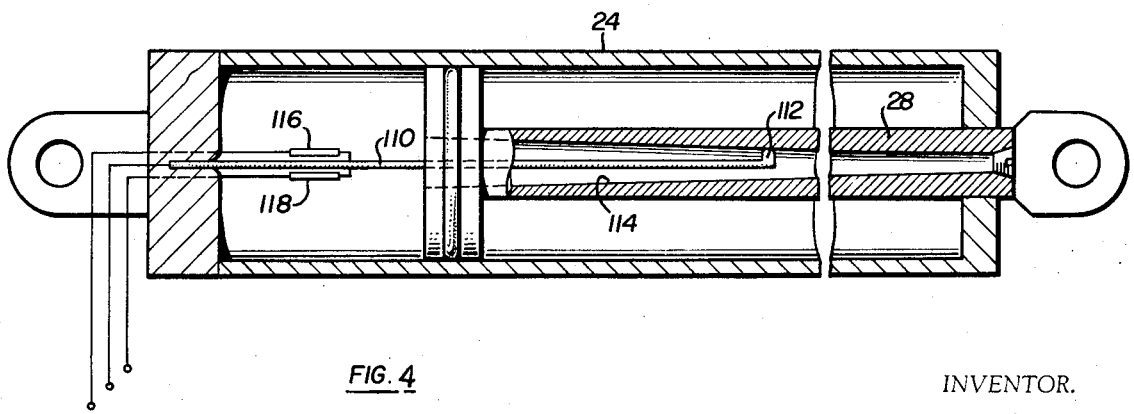
FIG. 4
INVENTOR.
THOMAS R. RENCH.
BY
SETTLE, BATCHELDER & OLTMAN.
ATT'YS.

INVENTOR.
THOMAS R. RENCH.
BY
SETTLE, BATCHELDER & OLTMAN.
ATT'YS.

CONTROL FOR FLUID RAM

BACKGROUND OF THE INVENTION

This application is a divisional application of my copending application for United States Letters Patent, Ser. No. 756,217, filed Aug. 29, 1968, now abandoned.

The present invention relates generally to control systems and more particularly to an improved system for accurately positioning the relatively movable elements of a fluid ram in any one of an infinite number of positions.

Many agricultural implements incorporate a fluid ram which is operable from or positionable by a manual control lever which actuates a valve to control the flow of pressured fluid to the cylinder of the fluid ram. The fluid ram is conventionally connected to relatively movable parts of the implement to thus set the position of the relatively movable parts, such as the ground working depth of a tillage implement. In the use of hydraulic actuated fluid rams which comprise a cylinder and piston, it is often desirable to provide a stop at some point intermediate the extended and retracted positions of the piston with respect to the cylinder. Of course, it is also essential that such stop or stops be adjustable so that they may be readily readjusted on any desired location.

Various types of mechanical, hydraulic and/or electrical arrangements have been proposed to control the extension and retraction of a fluid ram and to limit the movement of the piston with respect to the cylinder thereby providing predetermined stop means for the fluid ram.

However, all of the devices known to applicant require some type of manual adjustment of the stop arrangement to relocate the maximum extension and/or retraction of the piston with respect to the cylinder. Such an arrangement has been found objectionable since it requires the operator to continually manipulate a separate type of element either from the tractor or, in many instances, the adjustment of the stop necessitates the operator to dismount from the vehicle and readjust the stop mechanism. Such an arrangement is not only highly irritating to the operator but is also very time consuming and results in decreased productivity.

SUMMARY OF THE INVENTION

The present invention provides a control system for a fluid motor associated with an agricultural implement which enables the positioning of the relatively movable elements of the fluid ram to be directly related to the position of the manual control lever located adjacent the operator's compartment of the vehicle. The present control system incorporates electronic means which produce outputs which respectively are related to the relative position of the movable parts of a fluid ram and the selected position of the manual control lever and integrate the two outputs into a single voltage which actuates a control valve to control the flow of fluid to and from the ram thereby positioning the relatively movable parts to correspond to the position selected by the manual control lever.

One of the preferred embodiments of the control includes a cantilever beam, within the fluid ram, whose deflection is responsive to the position of the piston rod. A variable resistor or strain gage is connected to the beam, such that the electrical output of the variable resistor is also responsive to the relative position of the piston rod. In the disclosed embodiment, one end of the cantilever beam is fixed within the fluid ram and the free end is received within a tapered axial opening in the piston rod such that the deflection of the beam is directly dependent upon the position of the piston rod within the cylinder. A pair of strain gages are connected in parallel to the beam, to compensate for the temperature variations within the fluid ram, and the manual control is a variable resistance potentiameter in one of the parallel circuits.

Thus, the primary object of the present invention is to provide a control system including an electric circuit having an output which is related to the position of the manual control lever and to the relative position of movable parts of a fluid ram.

Another object is to provide a control system which is capable of accurately positioning the piston rod within a cylinder in any one of an infinite number of positions which are directly related to the selected positions of the manual control lever located remote from the fluid ram.

A further object is to provide an improved control system having a first electrical element which produces an output related to the position of the piston rod within a cylinder and a second electrical element having an output related to the selected position of a manual control lever with the outputs being incorporated to control a valve.

Other objects of this invention will appear in the following description and appended claims reference being had to the accompanying drawings forming a part of this specification wherein like reference characters designate corresponding parts in the several views.

BRIEF DESCRIPTION OF DRAWINGS

FIG. 1 illustrates schematically a side elevation view of a vehicle having an agricultural implement connected thereto and having the invention incorporated therein;

FIG. 2 is a sectional view of the fluid ram incorporating certain features of the present invention;

FIG. 4 is a sectional view of a fluid ram showing a modified form of the present invention.

DETAILED DESCRIPTION

Figure 3:
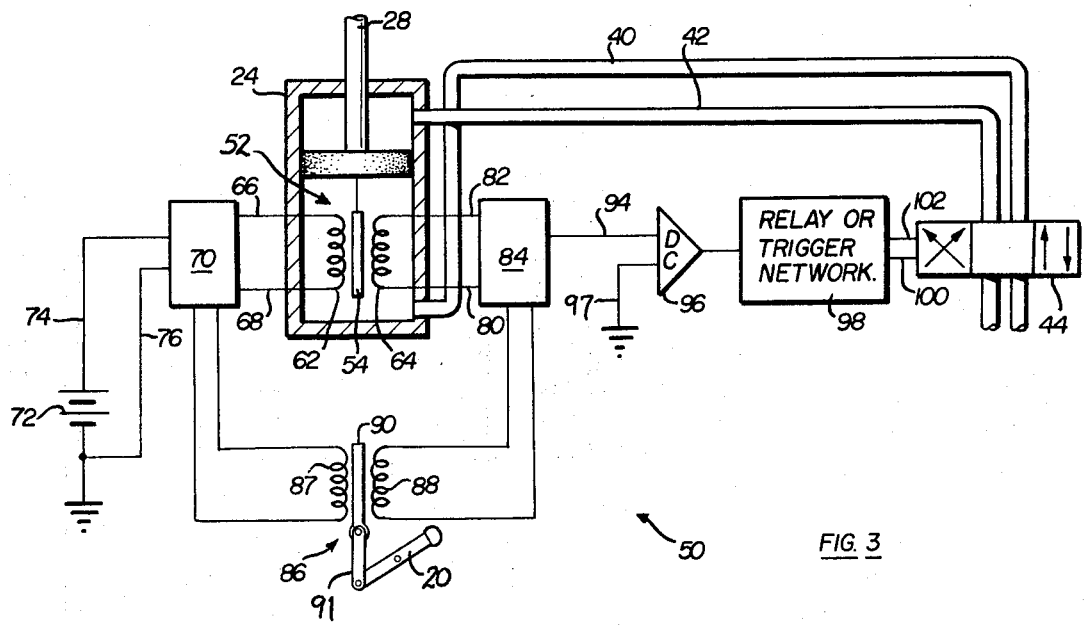
FIG. 3 is a schematic illustration of an electric circuit having the elements of the present invention incorporated therein.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

FIG. 1 of the drawings shown a vehicle 10, such as a tractor, having an agricultural implement 12 connected through a conventional hitch 14. The tractor of course includes the conventional operator's seat 16 forming the operator's station and a steering wheel 18 as well as a manual control lever 20 which conventionally is utilized to control extension and retraction of the fluid ram 22 associated with the implement 12. The fluid ram has the cylinder 24 thereof connected to a first or generally fixed element 26 of the agricultural implement 12 and the piston rod 28 connected to a relatively movable element 30 through a conventional linkage 32. The movable element 30 conventionally supports one or more wheels 34 while the fixed element 26 supports a ground tillage implement such as a plow share 36.

Pressured fluid is generally supplied to opposite ends of the cylinder 24 through conduits 40 and 42 respectively connected to opposite ends of the cylinder and associated with a control valve 44 which is normally movable in opposite directions from a neutral position to supply pressured fluid to one of the lines 40 or 42 while connecting the other of the lines to a drain (not shown). The control valve 44 is usually actuated by some connecting mechanism upon movement of the manual control lever 20 in either direction.

According to the present invention, the movement of the valve is controlled by an electric circuit having a plurality of elements incorporated in a control box 50 and additional elements incorporated in the fluid ram 22, as will become apparent hereinafter. The electric circuit forming the basis of the present invention incorporates a first element having an output which is related to the relative position of the piston rod 28 within the cylinder 24 and a second element having an output related to the position of the manual control lever of member 20. These outputs are integrated into a single voltage output which actuates the control valve to supply fluid to the appropriate end of the cylinder 24.

As illustrated in FIGS. 2 and 3, the fluid ram or motor 22 incorporates electric means 52 producing an electric signal which is a function of the relative position of the piston rod 28 with respect to the cylinder 24. In the embodiment illustrated in FIG. 2, the means 52 is in the form of a linear variable differential transformer, the core 54 thereof being connected to a plug 56 carried within a tubular bore 58 formed in the rod and piston of the fluid ram 22. The linear variable differential transformer also includes a tubular element 60 connected to the head of the cylinder and slidably received in opening 58 of the piston rod 28 with the core 54 of course being slidable within the tubular member 60. The tubular member 60 forming part of the transformer supports the primary and secondary windings 62 and 64 in a well known manner.

The primary winding 62 has output leads 66 and 68 which are connected through a DC and AC convertor 70 to a DC power supply 72 by lines 74 and 76. The power supply may conveniently be part of the vehicle 10.

The secondary winding of course also has leads 80 and 82 which are respectively connected to a comparator demodulator device 84 which is adapted to again convert the AC signal output from the secondary windings of the transformer to a DC voltage, for a purpose to become apparent hereinafter.

The electric circuit operatively connecting the manual control lever to the control valve 44 also includes electric means 86 which produces an output signal as a function of the position of the lever. In the embodiment illustrated in FIGS. 1 through 3 the electric means is a linear variable differential transformer 86 having its primary winding 87 connected to convertor 70 and secondary winding 88 connected to the device 84. The core 90 of the transformer 86 is connected through link 91 to the manual control lever 20.

The output of the integrating device or comparator 84 is a combined function of the input from the secondary winding 64 through lines 80 and 82 as well as the function of the input received from the secondary winding of the transformer 86. This output signal is fed through line 94 to a DC amplifying device 96 which is grounded through line 97 and thereafter through a triggering network or relay 98 and through lines 100 and 102 to actuate the control valve 44 through suitable electric means (not shown). Since all of the electrical devices 70, 84, 96 and 98 are of the conventional commercially available type it is not believed necessary that a detailed description thereof is required. Suffice it to say that the convertor 70 converts the DC voltage of battery 72 to an AC supply to the primary windings 62, 87 of the transformers 52, 86 while the demodulating-comparing device 84 compares the signals from secondary windings 64 and 88 integrates the single AC resultant signal to produce a resultant DC output as a function of the combined signals from the secondary windings 64, 88 of the transformers 52 and 86.

The triggering network 98 may again be of any commercially available type such as a polarized relay assembly which selectively supplies current to the control valve 44 to actuate the three-position valve in either direction depending upon the direction of current within the relay coil. One such device is commercially available and manufactured by Barber-Colman Company.

From the above description it is readily apparent that the control circuit provides a means for accurately positioning the piston rod of a fluid ram 22 in any one of an infinite number of positions between the extreme extended and extreme retracted position within the cylinder. The positioning of the valve is dependent upon the position of the manual control lever 20.

OPERATION

The operation of the control system is readily apparent from the above description. Thus, movement of the manual control lever 20 will move the core 90 of transformer 86 to vary the magnetic flux and the output of the secondary winding 88 as a function of the position of the control lever. The resultant output of the comparator-demodulator device supplied to the triggering network appropriately actuates the valve to supply fluid to either conduits 40 or 42 to extend or retract the piston 28 with respect to the cylinder 24.

As the piston rod is extended or retracted the core 54 moves within the tubular member 60 having the primary and secondary windings 62 and 64 incorporated therein to thereby vary the magnetic flux and the output of the secondary winding as a function of the position of the piston rod within the cylinder. Of course, when the piston rod reaches a predetermined position selected by the position of the manual control member 20, the output voltage from demodulator 84 is fufficiently reduced to the relay or triggering network 98 to cause the valve 44 to move to the neutral position shown in FIG. 3 and thus cause the piston to stop moving.

Of course any subsequent changes in either the piston rod 28 with respect to the cylinder 24 or the manual control lever 20 will again disturb the balance of the signals received from secondary windings 64 and 88 to again actuate the valve 44.

The various elements of the control circuit are selected and adjusted such that the position of the piston rod within the cylinder is directly related to the position of the operator's control lever on the tractor. For example, if the hand lever is centered between the opposite extreme positions, the piston having the rod 28 connected thereto would be at the midpoint with respect to the extended and retracted position within the cylinder 24. Of course, suitable indicia means could be provided directly adjacent the manual control lever which would show either the position of the piston rod 28 with respect to the cylinder 24 and/or the actual ground working depth of the tillage implement 36. Of course, this indicia means could readily be changed to correspond to any particular agricultural implement.

MODIFIED EMBODIMENT

Figure 5:
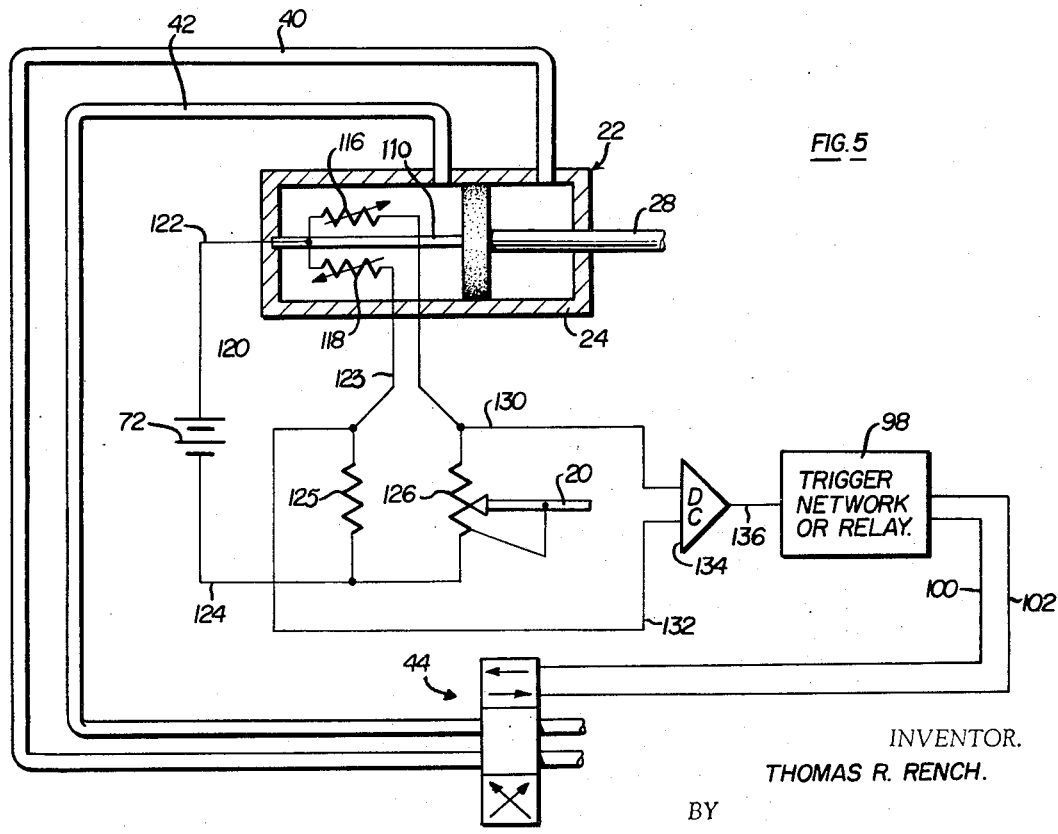
FIG. 5 is a modified electric circuit which may be used in conjunction with the fluid ram shown in FIG. 4.

A slightly modified control circuit is disclosed in FIG. 5 and is particularly adapted for a modified type electronic means incorporated within the fluid ram 22 and disclosed in FIG. 4. Since many of the elements of the hydraulic control circuit are identical to the embodiment illustrated in FIGS. 1 through 3, like reference numerals have been applied to identical parts in the two embodiments.

In the embodiment illustrated in FIGS. 4 and 5, the means 52 for producing an electric signal which is a function of the relative position of the piston rod within the cylinder includes a cantilever beam 110 having one end thereof fixedly secured to the head of the cylinder 24. The opposite end 112 of the beam extends into a tapered opening 114 formed in the piston rod 28. The free end 112 of the cantilever beam 110 bears against the tapered or inclined surface defined by the opening 114. Of course, it is readily apparent that extension and retraction of the piston rod 28 with respect to the cylinder 24 will cause a vertical deflection, as viewed in FIG. 4, of the free end 112 of the cantilever beam 110. The deflection of the end 112 of the beam 110 is measured by a variable resistance device illustrated as a pair of strain gages 116 and 118 attached at diametrically opposed points on the cantilever beam 110.

The variable resistors 116 and 118 form a part of an electrical circuit 120 which includes the vehicle electrical power source 72. For this purpose, one side of the battery 72 is connected through lead 122 to one side of each of the resistors 116 and 118. The opposite side of the variable resistor 118 is connected through a lead 123 and a fixed resistance 125 to the opposite side of the battery 72 through a line 124.

A circuit parallel to the circuit incorporating a variable resistance or strain gage 118 includes variable resistor or strain gage 116 and a variable resistor or adjustable potentiometer 126 which, similar to the transformer 86 discussed hereinabove with reference to FIG. 3, produces a variable output which is a function of the position of the lever 20. Of course, the resistance of variable potentiometer 86 is determined by the position of the manual control lever 20.

Outputs from the parallel circuits incorporating the respective variable resistances 116 and 118 are connected through lines 130 and 132 to an amplifier network 134 which produces an output voltage line 136 which is a function of the accumulated sums of the respective individual voltages or current in the two parallel circuits, for a purpose which will be described hereinafter. The output through line 136 again actuates the trigger network or relay 98 to selectively actuate control valve 44 through lines 100 and 102 and supply fluid to either end of the cylinder 24.

The operation of the modified device is identical to that described hereinabove in connection with the embodiment shown in FIGS. 2 and 3.

While only a single strain gage or variable resistance would actually be needed for carrying out the function of the present invention, it is preferred that the parallel circuits be incorporated and the output of the two circuits added to produce a single output. Thus, the parallel circuits will be of course double the output of the control circuit 120 to the triggering network 98. Also, utilizing two strain gages in a circuit as illustrated in FIG. 5 will negate any variations in resistance which normally would be encountered due to temperature changes of the individual strain gages. It is readily apparent that the strain gages are actually located in the fluid located in the cylinder and fluid will be subjected to considerable temperature variations dependent upon the ambient temperature as well as the amount of operation of the hydraulic cylinder assembly.

Either of the two circuits set forth in detail hereinabove is capable of accurately positioning the piston and rod of a fluid ram in any one of an infinite number of positions between the extended and retracted position. Of course, such a highly desirable system eliminates the necessity for the individual adjustable stops heretofore considered necessary to any acceptable type of control system for a remote fluid ram.

It should be noted that the electric means 52, 86 and 116, 118 and 126 are readily interchangable. Thus, for example, the linear variable differential transformer 86 could be substituted for the variable potentiometer 126 and vice versa and would only necessitate appropriate conversion devices for changing the DC signal to an AC signal and vice versa. Likewise, the transformer 52 could be replaced by strain gages 116 or 118 in the circuit of FIG. 3 again with appropriate convertors.

What is claimed is:

1. A control system for controlling the flow of fluid to and from a fluid motor having a cylinder and a piston rod slidable in said cylinder, including valve means, position selector means for selecting a desired position of said piston rod with respect to said cylinder, first electric means having an output related to the selected position of said piston rod, second electric means cooperating with said piston rod and cylinder and having an output related to the position of said piston rod in said cylinder, and electronic means for integrating said outputs to produce a signal controlling said valve means whereby the piston rod is moved to the selected position within said cylinder; said first electric means and said second electric means comprising variable resistance elements, said second electric means including a cantilever beam carried by one of said cylinder and piston rod, means defining a tapered opening in the other of said cylinder and piston rod for slidably receiving the free end of said cantilever beam in contacting relation with the surface of said tapered opening and variable resistance means carried by said beam whereby extension and retraction of said piston rod deflects said beam to vary said resistance means as a function of the position of said piston rod.

2. A control system as defined in claim 1, in which said second electric means comprises at least one electrical resistance element having a variable resistance which is a function of the position of said piston rod in said cylinder.

3. A control system as defined in claim 1, in which said variable resistance means comprises a pair of strain gages supported on opposed sides of said beam and each having a variable resistance dependent upon deflection of said beam, and said first means comprises variable potentiometer means having a variable resistance dependent upon the setting of said position selector means, and said electronic means including parallel circuits, one of said circuits including said variable potentiometer means and one of said strain gages and the other of said circuits including the other of said strain gages, and means connected to each of said circuits to produce said signal as a function of the combined current flow in said circuits.

4. A control system for controlling the relative positions of a piston having a piston rod slidable within a fluid cylinder, comprising:

a cantilever beam having one end fixed within said fluid cylinder, opposite said piston, the free end of said cantilever beam received in a tapered generally axial opening within said piston rod, through said piston, such that the deflection of said beam is proportional to the position of said piston within said fluid cylinder, an electrical strain gage means operably connected to said cantilever beam, and an electrical means, including said strain gage means, producing an electrical signal which is a function of the deflection of said beam.

5. The control system defined in claim 4, characterized in that said control system includes a valve means adapted to selectively supply fluid to opposite ends of said fluid cylinder to adjust the position of said pistons therein, a manual control selectively positionable to control said valve means, a second electrical means producing an electrical signal which is a function of the selected position of said manual control, and means adapted to integrate said electrical signals for actuating said valve and adjusting the position of said piston to correspond to the selected position of said manual control.

6. The control system defined in claim 5, characterized in that said manual control is a variable resistance potentiometer and said strain gage means includes two strain gages connected in parallel.

* * * * *